(12) United States Patent
Ge et al.

(10) Patent No.: US 10,090,796 B2
(45) Date of Patent: Oct. 2, 2018

(54) VIBRATION CONFORMANCE COMPENSATION DEVICE AND COMPENSATION METHOD THEREOF

(71) Applicants: Huan Ge, Shenzhen (CN); Rongguan Zhou, Shenzhen (CN)

(72) Inventors: Huan Ge, Shenzhen (CN); Rongguan Zhou, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 158 days.

(21) Appl. No.: 15/403,554

(22) Filed: Jan. 11, 2017

(65) Prior Publication Data

US 2018/0026572 A1    Jan. 25, 2018

(30) Foreign Application Priority Data

Jul. 21, 2016   (CN) .......................... 2016 1 0581275

(51) Int. Cl.
| | |
|---|---|
| *H02K 41/00* | (2006.01) |
| *H02P 29/50* | (2016.01) |
| *H02K 11/215* | (2016.01) |
| *H02P 25/06* | (2016.01) |

(52) U.S. Cl.
CPC .......... *H02P 29/50* (2016.02); *H02K 11/215* (2016.01); *H02P 25/06* (2013.01)

(58) Field of Classification Search
CPC ...... H02K 41/03; H02K 41/031; H02P 25/06; H02P 29/50
USPC ................. 318/135, 460, 114, 128, 687, 459
See application file for complete search history.

(56) References Cited

U.S. PATENT DOCUMENTS

| | | | | | |
|---|---|---|---|---|---|
| 4,888,543 | A | * | 12/1989 | Bleijenberg | ......... G05B 19/231 318/721 |
| 5,296,790 | A | * | 3/1994 | Fincher | .................. G11B 33/08 318/460 |
| 5,384,676 | A | * | 1/1995 | Yokoyama | ............. G11B 5/588 360/77.13 |
| 5,452,594 | A | * | 9/1995 | Kim | ........................ D06F 19/00 366/116 |
| 2002/0149561 | A1 | * | 10/2002 | Fukumoto | .......... G01C 21/3664 345/156 |
| 2016/0258758 | A1 | * | 9/2016 | Houston | ................ G01C 21/20 |

FOREIGN PATENT DOCUMENTS

| | | | | | |
|---|---|---|---|---|---|
| JP | 07068075 | A | * | 3/1995 | ............. D06F 19/00 |
| JP | 2013113729 | A | * | 6/2013 | |

* cited by examiner

*Primary Examiner* — Jorge L Carrasquillo
(74) *Attorney, Agent, or Firm* — IPro, PLLC; Na Xu

(57) ABSTRACT

A vibration conformance compensation device includes a linear motor including a vibrator and a coil, a signal generator connecting with the linear motor electrically and outputting a drive signal for driving the linear motor to vibrate, a working parameter feedback module, a processing module connecting having a target vibration state value which is set in the linear motor in advance for comparing the real-time vibration state parameters of the linear motor with the target vibration state value to obtain the comparison result, and a signal conditioning module connecting with the processing module and the signal generator electrically and adjusting the drive signal in accordance with the comparison result to make the vibration state of the linear motor consistent with the target vibration state.

6 Claims, 2 Drawing Sheets

VIBRATION CONFORMANCE COMPENSATION DEVICE AND COMPENSATION METHOD THEREOF

FIELD OF THE INVENTION

The present disclosure is related to a vibration conformance compensation device and a method thereof.

DESCRIPTION OF RELATED ART

The portable consumer electronic products are favored by more and more people along with development of the electronic technologies, such as mobile phone, handheld game player, navigation unit or handheld multimedia entertainment equipment, etc. The vibration feedback, taken as one feedback form of the portable electronic product has been applied to provide the functions, such as the tactile feedback, etc. related to the application program and the scene from the initial functions, such as the incoming call prompt, etc. gradually. While the motor is the primary element providing vibration feedback in the mobile equipment and usually comprises a rotary motor, a piezoelectric motor, a linear motor, etc., wherein the linear motor has the absolute advantages on the aspect of providing the tactile feedback function related to the application program and the scene due to small volume, long service life, low power consumption, quick response time, etc. thereof.

The basic working principle of the linear motor is similar to that of a loudspeaker, specifically drive the mechanical structure to vibrate by using an ampere force that is exerted to the electrified coil in a magnetic field. The complete conformance of vibration cannot be realized among the linear motor samples of identical model in the current technology due to effect of factors, such as the parameters of the material, the production equipment, the external environment, etc. Moreover, the user experience may be affected because of certain difference of the electronic devices in terms of vibrating effect shown finally.

Thereof, it is necessary to disclose a conformance compensation device and a compensation method thereof.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain this disclosure, not intended to limit this disclosure.

Figure 1:
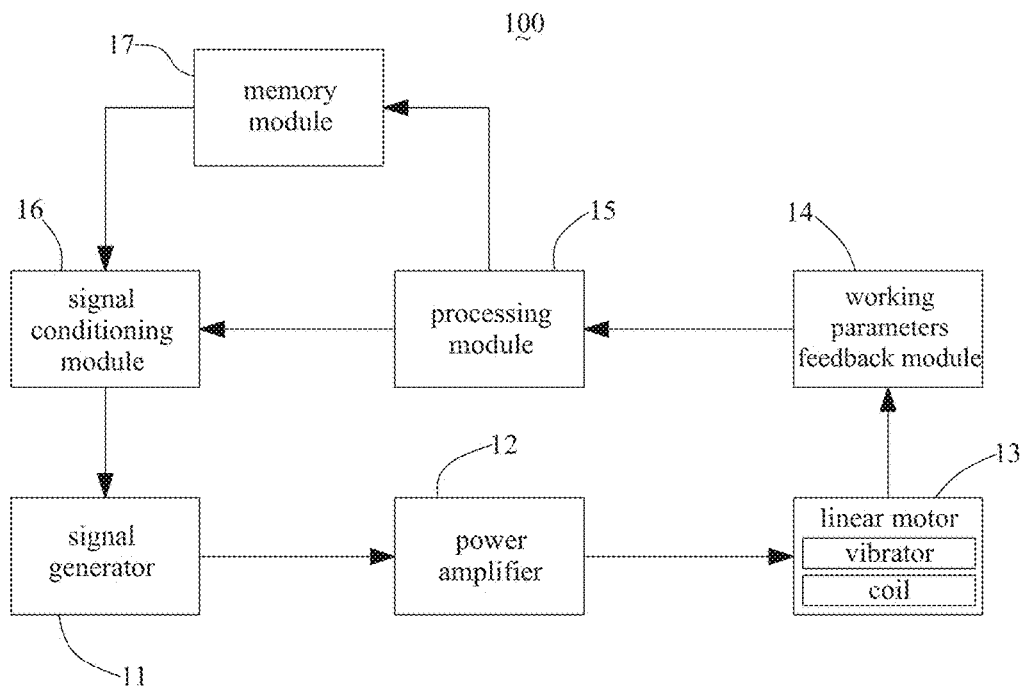
FIG. 1 is a structural diagram of vibration conformance compensation device in accordance with a first exemplary embodiment of the present disclosure.

Referring to FIG. 1, a vibration conformance compensation device 1 in accordance with a first embodiment of the present disclosure comprises a signal generator 11, a power amplifier 12, a linear motor 13, a working parameters feedback module 14, a processing module 15, a signal conditioning module 16 and a memory module 17, wherein the signal generator 11, the power amplifier 12, the linear motor 13, the working parameters feedback module 14, the processing module 15 and the signal conditioning module 16 are connected end to end electrically and sequentially, thereby forming a compensation circuit. Moreover, the memory module 17 is connected with the processing module 15 electrically.

The signal generator 11 is taken to output a drive signal which drives the linear motor 13 to work, and the initial drive signal has the special amplitude and the frequency which may be changed along with the time.

The power amplifier 12 is taken to amplify the drive signal.

The linear motor 13 is taken to implement vibration in accordance with the drive signal amplified and comprises a vibrator driven by the drive signal and a coil generating an induced electromotive force by interacting with the vibrator.

The working parameters feedback module 14 is used for monitoring and returning the real-time vibration state parameters of the linear motor 13, specifically the real-time vibration state parameters comprise the amplitude of the vibrator. Moreover, a Hall sensor is taken as the working parameters feedback module 14, for detecting changes of a magnetic field generated due to vibration of the vibrator of the linear motor 13 and acquiring the amplitude of the vibrator by means of changes of the magnetic field.

A target vibration state of the linear motor 13 is set in the processing module 15 in advance, and the processing module 15 is used for acquiring the comparison result by comparing the real-time vibration state value with the target vibration state value; and specifically, the target vibration state value is the maximum amplitude of the vibrator. The amplitude returned of the vibrator is compared with the maximum amplitude which is set in advance of the vibrator. Moreover, the comparison result shall be put into the memory module 17 by using the processing module 15.

The signal conditioning module 16 is used for adjusting the drive signal in accordance with the comparison result, therefore the amplitude of the vibrator of the linear motor 13 and the maximum amplitude which is set in advance of the vibrator are kept consistent.

The memory module 17 is used for storing the comparison result.

Specifically, the initial drive signal having the special amplitude and the frequency changing along with the time is output by the signal generator 11. The linear motor 13 is driven to vibrate when the initial drive signal is amplified; and the Hall sensor monitors the amplitude of the vibrator of the linear motor 13 in real time and returns the real-time amplitude of the vibrator to the processing module 15. The frequency corresponding to the maximum amplitude of the vibrator, that is, the resonant frequency of the linear motor 13, can be acquired when the amplitude of the vibrator corresponds to the frequency of the initial drive signal. The resonant frequency is written into the memory module 17 by the processing module. The real-time amplitude of the vibrator can be compared with the target amplitude that is set in advance, that is, the maximum amplitude of the vibrator, after fixing the frequency of the subsequent drive signal at the point of the resonant frequency and keeping the amplitude of the drive signal still. Moreover, the subsequent vibration amplitude can be kept at the target amplitude which is set in advance after changing the amplitude of the initial drive signal correspondingly in accordance with the above-mentioned comparison result, sending the calibration factor among the two to the processing module 15 and then the processing module writes it into the memory module 17 by using the processing module.

Figure 2:
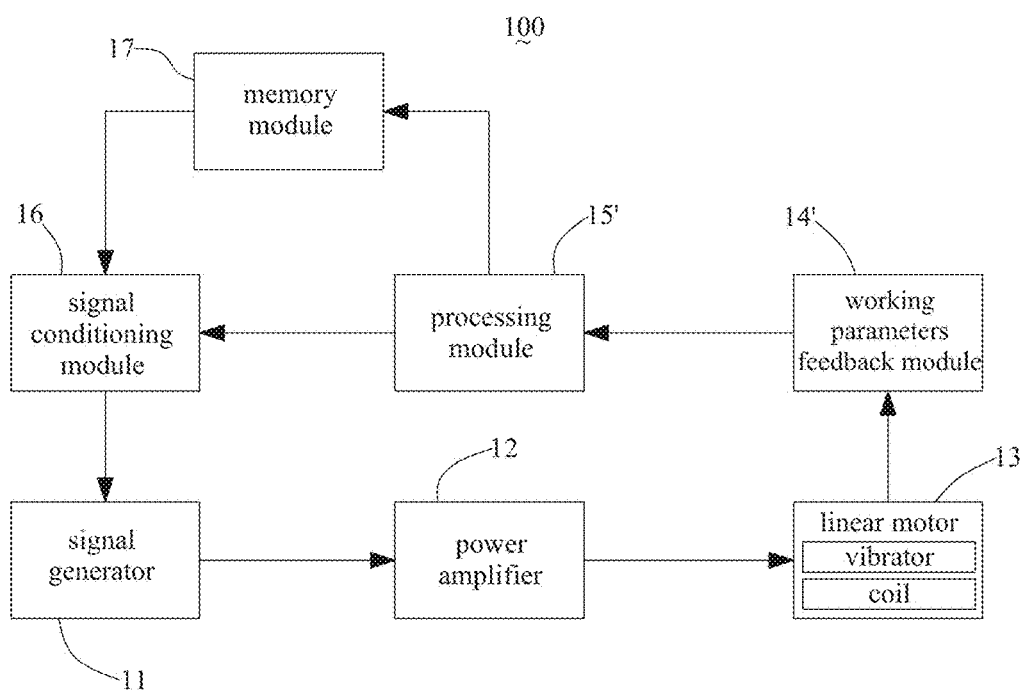
FIG. 2 is a structural diagram of vibration conformance compensation device in accordance with a second exemplary embodiment of the present disclosure.

FIG. 2 shows a vibration conformance compensation device in accordance with a second exemplary embodiment of the present disclosure. The main difference between the second embodiment and the first embodiment is: the real-time vibration state parameters returned by the working parameters feedback module 14' are different from the target vibration state value which is set by the processing module 15' in advance.

The working parameters feedback module 14' is used for monitoring and returning the voltages and the currents on two ends of the coil of the linear motor 13, and the induced electromotive force of the linear motor can be calculated by using the following formula: $u_b=B1v$, wherein the power coupling coefficient B1 is the known parameter of the linear motor; v is the vibrating speed of the vibrator; therefore, the calculation formula of the vibrating speed v can be represented: $v=(u-R_e i)/B1$, wherein u is the voltage monitored of the coil; i is the current monitored of the coil; and Re is the direct-current resistance of the coil. The low-frequency detecting signal, for example, the sine detecting signal with frequency of 20 Hz and amplitude of 40 mV is input to the linear motor 13 in order to measure the direct-current resistance Re of the working coil. The AC resistance of the linear motor can be acquired at the frequency point of the low-frequency detecting signal by combining with the current and the voltage returned when the low-frequency detecting signal is added; and approximate DC resistance of the working coil can be acquired when the linear motor works in real time because the impedance of the linear motor is relatively flat in the area approaching the direct current.

Correspondingly, the target vibration state value which is set in the processing module 15' in advance is the target amplitude of induced electromotive force. The identical vibration state can be implemented when the real-time amplitude of induced electromotive force and the target amplitude of induced electromotive force of the linear motor are kept consistent by comparing the returned amplitude of induced electromotive force with the target amplitude of induced electromotive force and adjusting the drive signal in accordance with the comparison result of the two induced electromotive force in presence of the signal conditioning module.

Figure 3:
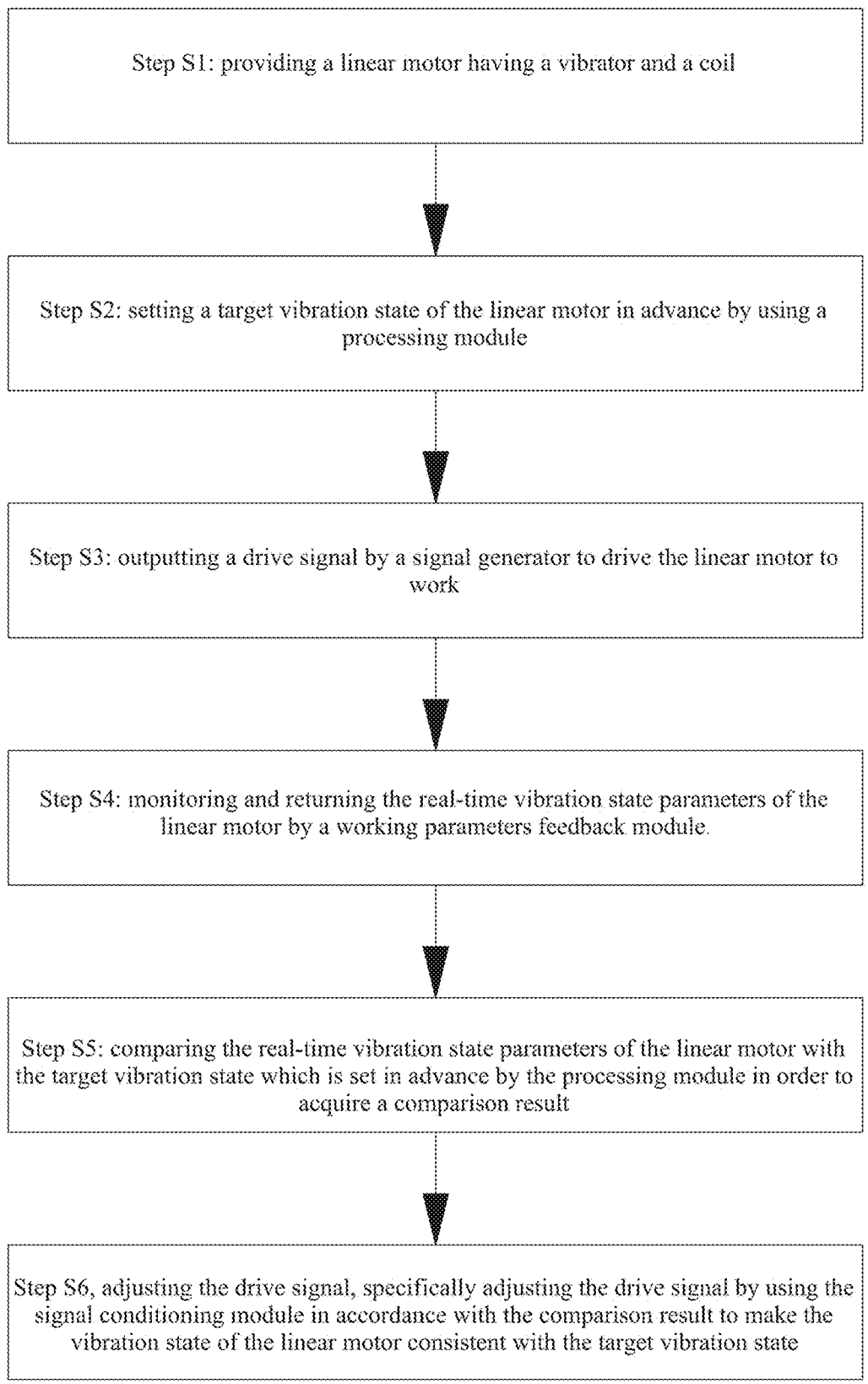
FIG. 3 is a flow chart of a compensation method of the present disclosure.

Referring to FIG. 3, a vibration conformance compensation method comprises the following steps:

Step S1, providing a linear motor having a vibrator and a coil;

Step S2, setting a target vibration state of the linear motor in advance by using a processing module.

Step S3, outputting a drive signal by a signal generator to drive the linear motor to work.

Step S4, monitoring and returning the real-time vibration state parameters of the linear motor by a working parameters feedback module.

Step S5, comparing the real-time vibration state parameters of the linear motor with the target vibration state which is set in advance by the processing module in order to acquire a comparison result.

Step S6, adjusting the drive signal, specifically adjusting the drive signal by using the signal conditioning module in accordance with the comparison result to make the vibration state of the linear motor consistent with the target vibration state.

The real-time vibration state and the target vibration state of the linear motor are kept consistent in the invention by comparing the real-time vibration state of the linear motor with the target vibration state which is set in advance and adjusting the drive signal in accordance with the comparison result. Through this method, the identical vibration sense can be implemented in each linear motor 13 in the electronic equipment of multiple linear motors 13, or the vibration sense of single linear motor can be kept consistent with the target vibration sense which is set in advance at any time; therefore, the experiences of the user during using can be improved.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration conformance compensation device comprising:
    a linear motor including a vibrator and a coil for generating induced electromotive force by interacting with the vibrator,
    a signal generator connecting with the linear motor electrically and outputting a drive signal for driving the linear motor to vibrate;
    a working parameter feedback module connecting with the linear motor electrically and monitoring and returning real-time vibration state parameters of the linear motor,
    a processing module connecting with the working parameter feedback module electrically, having a target vibration state value which is set in the linear motor in advance for comparing the real-time vibration state parameters of the linear motor with the target vibration state value to obtain the comparison result; and
    a signal conditioning module connecting with the processing module and the signal generator electrically and adjusting the drive signal in accordance with the comparison result to make the vibration state of the linear motor consistent with the target vibration state;
    wherein the real-time vibration state parameters comprise amplitude of the vibrator; and the target vibration state value is the maximum amplitude of the vibrator, the real-time amplitude of the vibrator is compared with a maximum amplitude of the vibrator after fixing the frequency of a subsequent drive signal at the point of the resonant frequency and keeping the amplitude of the drive signal still.

2. The vibration conformance compensation device as described in claim 1, further comprising a Hall sensor serving as the working parameter feedback module.

3. The vibration conformance compensation device as described in claim 1, wherein the real-time vibration state comprises a voltage value and a current value of the coil; and the target vibration state is the amplitude of the induced electromotive force of the linear motor.

4. The vibration conformance compensation device as described in claim 1, further comprising a power amplifier which connects between the signal generator and the linear motor serially and amplifies the drive signal.

5. A vibration conformance compensation method comprising following steps of:

providing a linear motor having a vibrator and a coil which generate a induced electromotive force by interacting with the vibrator;

predetermining a target vibration state of the linear motor;

driving the vibrator of the linear motor to vibrate by inputting a drive signal;

monitoring and returning real-time vibration state parameters of the linear motor;

comparing the real-time vibration state parameters with the target vibration state value;

adjusting the drive signal in accordance with the comparison result to make the vibration state of the linear motor consistent with the target vibration state;

wherein the real-time vibration state parameters comprise amplitude of the vibrator; and the target vibration state value is a maximum amplitude of the vibrator, the real-time amplitude of the vibrator is compared with the maximum amplitude of the vibrator after fixing the frequency of a subsequent drive signal at the point of the resonant frequency and keeping the amplitude of the drive signal still.

6. The vibration conformance compensation method as described in claim 5, wherein the vibration state parameters comprises a real-time working voltage of the linear motor and the current of the coil; and the target state value is the amplitude of the induced electromotive force of the linear motor.

* * * * *